(12) United States Patent
Lewis et al.

(10) Patent No.: US 9,053,827 B2
(45) Date of Patent: Jun. 9, 2015

(54) NUCLEAR FUEL ASSEMBLY WITH PIVOT DIMPLED GRIDS

(75) Inventors: Michael L. Lewis, Lexington, SC (US); Michael L. Boone, West Columbia, SC (US); Howard A. Pendley, II, Chapin, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1653 days.

(21) Appl. No.: 12/412,411

(22) Filed: Mar. 27, 2009

(65) Prior Publication Data

US 2010/0246748 A1 Sep. 30, 2010

(51) Int. Cl.
 *G21C 3/34* (2006.01)
 *G21C 3/356* (2006.01)
 *G21C 3/352* (2006.01)

(52) U.S. Cl.
 CPC .............. *G21C 3/3563* (2013.01); *G21C 3/352* (2013.01); *Y02E 30/40* (2013.01)

(58) Field of Classification Search
 USPC .......................... 376/426, 434, 438, 442, 462
 See application file for complete search history.

(56) References Cited

U.S. PATENT DOCUMENTS

| 3,377,254 | A | * | 4/1968 | Frisch ........................... 376/442 |
| 4,585,616 | A | | 4/1986 | DeMario et al. |
| 4,756,878 | A | * | 7/1988 | King et al. ..................... 376/439 |
| 5,331,678 | A | * | 7/1994 | Hatfield et al. ............... 376/442 |
| 6,310,932 | B1 | | 10/2001 | Evans et al. |
| 2006/0227925 | A1 | | 10/2006 | Marzean |
| 2007/0242793 | A1 | | 10/2007 | Song et al. |

* cited by examiner

*Primary Examiner* — Jack W Keith
*Assistant Examiner* — Marshall O'Connor
(74) *Attorney, Agent, or Firm* — Joseph C. Spadacene; Westinghouse Electric Company LLC

(57) ABSTRACT

A soft pivot dimple nuclear fuel assembly grid that utilizes a "dog bone" shaped window cutout and radius coining of edges perpendicular to coolant flow, to reduce the susceptibility of fuel rod leaking during the reactor operation. Radius coining allows the fuel rod to smoothly transition over the radiused edge to the flat rod contact section of the dimple. The symmetric "dog bone" shape enables the dimple to pivot during rod loading resulting in improved alignment between the dimple and the fuel rod, thereby minimizing scratching. The "dog bone" shape also allows for a large contact area dimple to be softer than a typical dimple which reduces contact stresses and fretting wear during reactor operations.

18 Claims, 4 Drawing Sheets

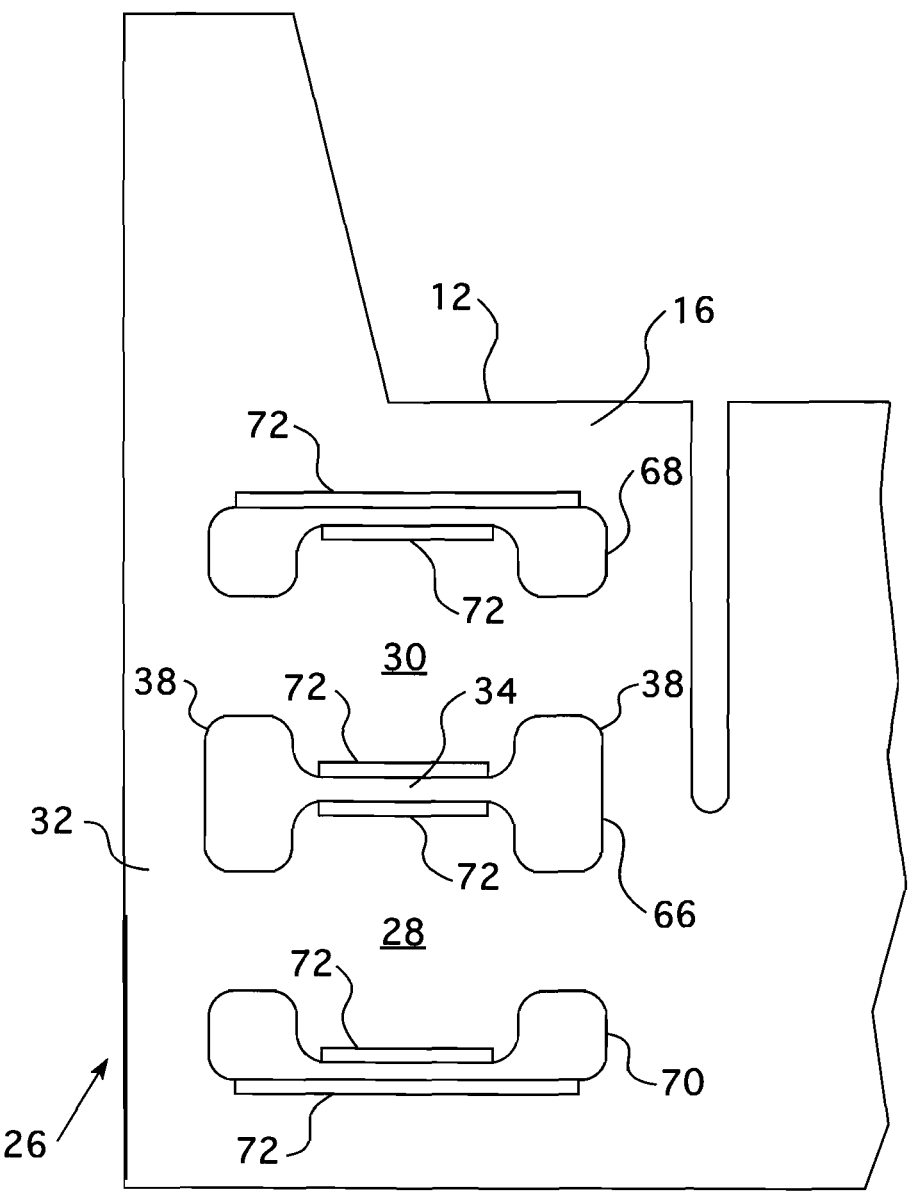

NUCLEAR FUEL ASSEMBLY WITH PIVOT DIMPLED GRIDS

BACKGROUND OF THE INVENTION

1. Field of the Invention

The present invention relates generally to nuclear reactors, and more particularly, to any nuclear reactor having a fuel assembly with an improved grid.

2. Description of the Related Art

In most water cooled nuclear reactors, the reactor core is comprised of a large number of elongated fuel assemblies. In pressurized water nuclear reactors (PWR), these fuel assemblies typically include a plurality of fuel rods held in an organized array by a plurality of grids spaced axially along the fuel assembly length and attached to a plurality of elongated thimble tubes of the fuel assembly. The thimble tubes typically receive control rods or instrumentation therein. Top and bottom nozzles are on opposite ends of the fuel assembly and are secure to the ends of the thimble tubes that extends slightly above and below the ends of the fuel rods.

The grids, as is known in the relevant art, are used to precisely maintain the spacing and support between the fuel rods in the reactor core, provide lateral support for the fuel rods and induce mixing of the coolant. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in the cells that are sized the same as those that receive fuel rods therein, or in relatively larger thimble cells defined in the interleaved straps. The interleaved straps provide attachment points to the thimble tubes, thus enabling their positioning at spaced locations along the length of the fuel assembly.

The straps are configured such that the cells through which the fuel rods pass each include one or more relatively compliant springs and a plurality of relatively rigid dimples. The springs and dimples may be formed in the metal of the interleaved straps and protrude outwardly therefrom into the cells through which the fuel rods pass. The springs and dimples of each fuel rod cell then contact the corresponding fuel rod extending through the cell. Outer straps of the grid are attached together and peripherally enclose the inner straps of the grid to impart strength and rigidly to the grid and to define individual fuel rod cells around the perimeter of the grid. The inner straps are typically welded or brazed at each intersection and the inner straps are also welded or brazed to the peripheral or outer straps defining the outer perimeter of the assembly.

At the individual cell level, the fuel rod support is normally provided by the combination of rigid support dimples and flexible springs as mentioned above. There are many variations to the spring-dimple support geometry that have been used or are currently in use, including diagonal springs, "I" shaped springs, cantilevered springs, horizontal and vertical dimples, etc. The number of springs per cell also varies. The typical arrangement is two springs and four dimples per cell. The geometry of the dimples and springs needs to be carefully determined to provide adequate rod support through the life of the assembly.

During irradiation, the initial spring force relaxes more or less rapidly, depending on the spring material and irradiation environment. The cladding diameter also changes as a result of the very high coolant pressure and operating temperatures and the pellets inside the rod also change their diameter by densification and swelling. The outside cladding diameter also increases, due to the formation of an oxide layer. As a result of these dimensional and material property changes, maintaining adequate rod support through the life of a fuel assembly is very challenging.

Under the effect of axial flow and crossflow induced by thermal and pressure gradients within the reactor and other flow disturbances, such as standing waves and eddies, the fuel rods, which are slender bodies, are continuously vibrating with relatively small amplitudes. If the rod is not properly supported, this very small vibration amplitude may lead to relative motion between the support points and the cladding. If the pressure exerted by the sliding rod on the relatively small dimple and grid support surfaces is high enough, a small corrosion layer on the surface of the cladding can be removed by abrasion, exposing the base metal to the coolant. As a new corrosion layer is formed on the exposed fresh cladding surface, it is also removed by abrasion until ultimately the wall of the rod is perforated. This phenomenon is known as corrosion fretting and in 2006 it was the leading cause of fuel failures in PWR reactors.

Support grids also provide another important function in the assembly, that of coolant mixing to decrease the maximum cooling temperature. Since heat generated by each rod is not uniform, there are thermal gradients in the coolant. One important parameter in the design of the fuel assemblies is to maintain efficient heat transfer from the rods to the coolant. The higher the amount of heat removed per unit time, the higher the power being generated. At high enough coolant temperatures, the rate of heat that can be removed per unit of cladding area in a given time decreases abruptly in a significant way. This phenomenon is known as deviation from nucleate boiling or DNB. If within the parameters of reactor operation, the coolant temperature were to reach the point of DNB, the cladding surface temperature would increase rapidly in order to evacuate the heat generated inside the rod and rapid cladding oxidation would lead to cladding failure. It is clear that DNB needs to be avoided to prevent fuel failures. Since DNB, if it occurs, takes place at the point where the coolant is at its maximum temperature, it follows that decreasing the maximum coolant temperature by coolant mixing within the assembly permits the generation of larger amounts of power without reaching DNB conditions. Normally, the improved mixing is achieved by using mixing vanes in the downflow side of the grid structure. The effectiveness of mixing is dependent upon the shape, size, and location of the mixing vanes relative to the fuel rod.

Other important functions of the grid include the ability to sustain handling and normal operation at anticipated accident loads without losing function and to avoid "hot spots" on the fuel rods due to the formation of steam pockets between the fuel rods and the support points, which may result when not enough coolant is locally available to evacuate the heat generated in the rod. Steam pockets cause over heating of the fuel rod to the point of failure by rapid localized coersion of the cladding.

Maintaining a substantially balanced cooling flow through the fuel assemblies across the core is a desirable objective to maintain substantially uniform heat transfer. Any changes in fuel assembly design can alter the pressure drop and affect the relative balance in flow resistance through the core among the various types of fuel assemblies. Changes in grid design that reduce pressure drop are desirable because such changes enable a fuel assembly designer to introduce other improvements that will restore the pressure drop equilibrium among fuel assemblies.

As previously mentioned, grid strap dimples and springs protrude into a grid cell location to position a nuclear fuel rod in the lattice array. The taller the dimple and the more it protrudes into the grid cell, the stiffer the dimple. This increased stiffness can result in the fuel rods being scratched or galled during rod loading. A stiffer dimple also increases the risk of dimple-to-rod fretting due to higher fuel rod contact stresses. Therefore the dimple designer needs to provide adequate stiffness to position the fuel rod, but minimize stiffness to reduce scratches, galling and the potential for fretting.

It is thus desired to provide an improved grid that exhibits effective heat transfer and improved fuel rods support with less potential for scratching or galling the fuel rods when they are loaded into the assembly. It is a further object of this invention to provide such an improved grid that has a number of manufacturing advantages.

SUMMARY OF THE INVENTION

The foregoing objectives are achieved by an improved nuclear fuel assembly grid having a first plurality of space, parallel, elongated straps and a second plurality of space, parallel, elongated straps positioned orthogonal to the first plurality of space, parallel, elongated straps. The first and second plurality of space, parallel elongated straps are aligned in a regular pattern so that the intersection of each set of four adjacent straps defines a cell, some of which support fuel rods, with an extent of each of the first and second straps that border each cell forming a wall of the cell. Preferably, the straps are interleaved at their intersections in an egg-crate pattern. A bordering strap surrounds the exterior perimeter of the first and second plurality of space, parallel, elongated straps and is affixed at the intersections with the interior straps. At least one wall of the cells that support fuel rods has a dimple that extends from the wall into the cell from a "dog bone" shaped cutout in the wall of the cell.

In one embodiment, the dimple has upstream and downstream edges that contact the fuel rod when the fuel rod is loaded into the grid wherein the upstream and downstream edges are rounded in a direction away from the fuel rod to avoid having any abrupt surfaces contact the rod as the rod is loaded or unloaded. The rounded edges are formed by radius coining. Preferably, the first and second plurality of straps have an axial dimension that extends along the elongated dimension of the strap and the "dog bone" shaped cutout extends parallel to the axial dimension.

In one embodiment, the "dog bone" shaped cutout comprises three spaced cutouts that are stacked in spaced relationship along the height of the wall of the cell with a central cutout in a traditional "dog bone" shape comprising a central rod having a lobe at either end, an upper cutout comprising a half of a traditional "dog bone" shape divided along the rod and through the lobes with the lobes facing toward the central cutout and a lower cutout comprising a half of a traditional "dog bone" shape divided along the rod and through the lobes with the lobes facing toward the central cutout. Desirably, the dimple, in a side view, is a pedestal with a platform on top that extends out over the pedestal.

BRIEF DESCRIPTION OF THE DRAWINGS

A further understanding of the invention can be gained from the following description of the preferred embodiment when read in conjunction with accompanying drawings in which:

FIG. 3 is a side view of a grid strap wall showing two vertically stacked dimples;

FIG. 4 is a plan view of the dimples shown in FIG. 3;

DESCRIPTION OF THE PREFERRED EMBODIMENT

Nuclear fuel spacer grids are used in fuel assemblies to position nuclear fuel rods. Accurately positioning nuclear fuel rods is critical to assure proper nuclear and thermo-hydraulic performance of the nuclear core of a reactor. An ideal nuclear fuel space grid should:

1. Be simple and inexpensive to manufacture;
2. Permit fuel rod reconstitution and easy loading of the fuel rods;
3. Maintain fuel assembly geometry over the lifetime of the fuel assembly;
4. Be of a lower pressure drop design, yet promote coolant mixing and heat transfer; and
5. Be low neutron absorbers.

Figure 1:
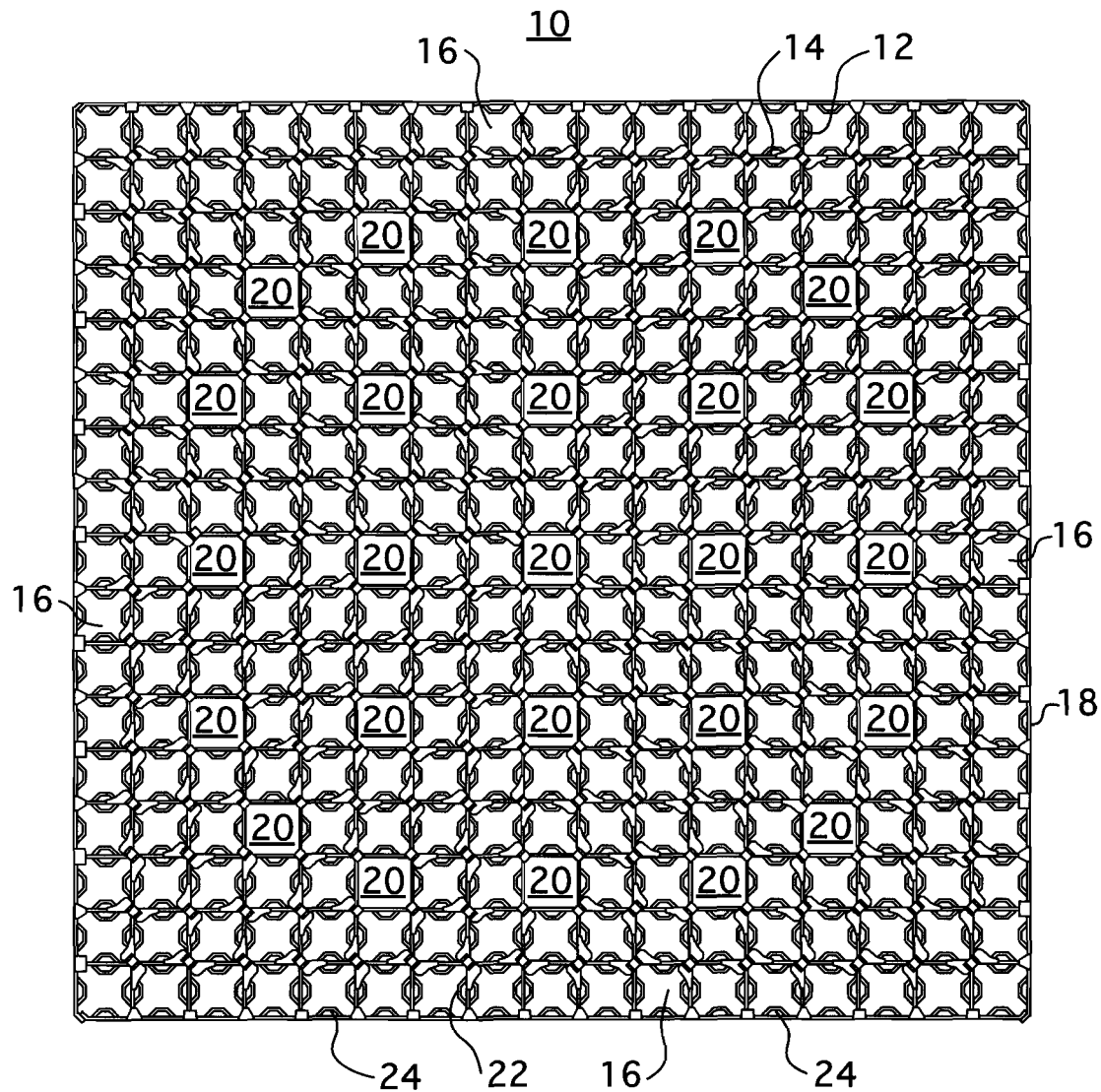
FIG. 1 is a top plan view of a pressurized water reactor conventional fuel assembly grid.

Many conventional spacer grids are composed of straight grid straps that are interleaved together to form an egg-crate configuration having a plurality of roughly square cells, many of which support fuel rods. An example of such a conventional fuel grid 10 can be found in FIG. 1. A spaced, parallel array of grid straps 12 of equal length are positioned orthogonally to a second plurality of the spaced, parallel grid straps 14 of equal length and are encircled by a border strap 18, with each of the straps being welded at their intersections. The cells 16 support the fuel rods while the cells 20 support guide tubes and an instrumentation tube. Because the fuel rods must maintain a spacing or pitch between each other, these straight grid straps 12 and 14 at the locations that border the cells 16 that support the fuel rods have springs 22 and/or dimples 24 that are stamped in the sides of the straps 12 and 14 to protrude into the cells 16 to contact the fuel rods and hold them firmly in position. The stamped features on the grid straps 12 and 14, i.e., the springs 22 and the dimples 24, require careful design and precise manufacturing to assure adequate force is maintained to secure the fuel rods when considered in combination with the other grids in the tandem array of grids along the fuel assembly.

Figure 2:
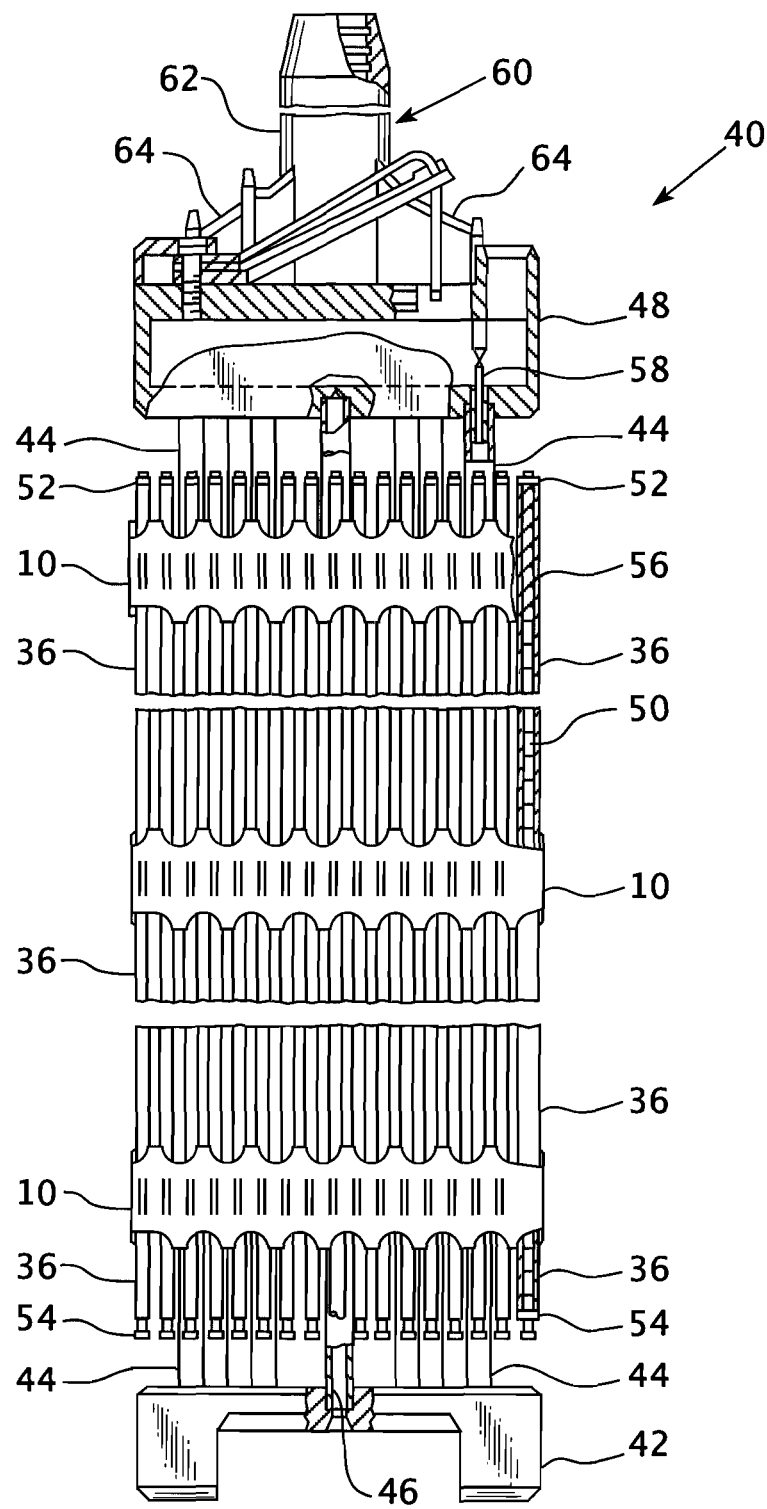
FIG. 2 is an elevational view, partially in section, of a fuel assembly which employs the fuel rod grid of the present invention; the assembly being illustrated in vertically foreshortened form with parts broken away for clarity.

Referring to FIG. 2, there is shown an elevational view of a fuel assembly represented in vertically foreshortened form and being generally designated by reference character 40. The fuel assembly 40 is of the type used in a pressurized water reactor and basically includes a lower end structure or bottom nozzle 42 for supporting the fuel assembly on a lower core plate (not shown) in the reactor core region and a number of longitudinally extending guide thimbles or tubes 44 which project upwardly from the bottom nozzle 42. The assembly 40 further includes a plurality of transverse grids 10, constructed in accordance with this invention, and partially shown in more detail in FIGS. 3, 4 and 5. The grids 10 are axially spaced along and supported by the guide thimbles 44. Assembly 40 also includes a plurality of elongated fuel rods 36 transversely spaced and supported in an organized array by the grids 10. Also, the assembly 40 has an instrumentation tube 46 located in the center thereof and an upper end structure or nozzle 48 attached to the upper ends of the guide thimbles 44. With such an arrangement of parts, the fuel assembly 40 forms an integral unit capable of being conveniently handled without damaging the assembly of parts.

As mentioned above, the fuel rods 36 and the array thereof in the assembly 40 are held in spaced relationship with one another by the grids 10 spaced along the fuel assembly length. Each fuel rod 36 includes nuclear fuel pellets 50 and the opposite ends of the rods 36 are enclosed by upper and lower end plugs 52 and 54, to hermetically seal the rod. Commonly, a plenum spring 56 is disposed between the upper end plug 52 and the pellets 50 to maintain the pellets in a tight, stacked relationship within the rod 36. The fuel pellets 50 composed of fissile material are responsible for creating the reactive power of the PWR. A liquid moderator/coolant, such as water or water-containing boron, is pumped upwardly through the fuel assemblies of the core in order to extract heat generated therein for the production of useful work.

To control the fission process, a number of control rods 58 are reciprocally movable in the guide thimbles 44 located at predetermined positions in the fuel assembly 40. Specifically, the top nozzle 48 has associated therewith a rod cluster control mechanism 60, having an internally threaded cylindrical member 62 with a plurality of radially extending flukes or arms 64 such that the control mechanism 60 is operable to move the control rods 58 vertically in the guide thimbles 44 to thereby control the fission process in the fuel assembly 40, all in a well known manner.

As previously mentioned the design of the contact area between the sidewalls of the grid cells that support the fuel rods and the cladding surface of the rods is critical to assure that there is enough force to secure the rods against harmful vibrations without scarring the cladding. To that end, this invention provides a soft pivot dimple grid design that utilizes a "dog bone" shaped window cutout and radius coining of edges perpendicular to coolant flow to minimize pressure drop and reduce the susceptibility of fuel rod leaking during reactor operation. The radius coining feature eliminates the typical work-hardened/raised material common with historically chamfered dimple edges which lead to fuel rod scratching/galling. Radius coining enables the fuel rod to smoothly transition over the radiused edge to the flat rod contact section of the dimple. The symmetric "dog bone" shape feature gives the dimple more of an opportunity to pivot during rod loading resulting in an improved alignment between the dimple and the fuel rod, thereby minimizing scratching. The "dog bone" shape also allows for a large contact area dimple to be softer than a typical dimple, which reduces contact stresses and fretting wear during reactor operations.

The "dog bone" shape also increases the strength of the die punch during manufacture, since it allows for more material to be used in the punch resulting in less stress and wear of the die punch and decreases the load needed to displace the dimple during forming, thus reducing manufacturing costs. The "dog bone" shape decreases the stiffness of the dimple associated with the dimple-to-rod contact, since the window was cut out up into the form of the dimple profile radius, resulting in a minimization of dimple-to-rod wear due to lower contact stresses during reactor operations.

A portion of a grid strap 12 containing the soft pivot dimple grid design of this invention is illustrated in FIG. 3, though it should be appreciated that the dimple design of this invention 26 may be applied to one or both of the straps 12 and 14. Two such dimples 28 and 30 are shown in the width of the single cell 16 located on a cell wall 32. The dimple arrangement 28 and 30 extends from the wall 32 into the cell 16 from a "dog bone" shape cutout in the wall 32 of the cell 16. The "dog bone" shaped cutout of the dimple arrangement 28 and 30 preferably comprises three spaced cutouts 66, 68 and 70. The three spaced cutouts are stacked in spaced relationship along the height of the wall 32 of the cell 16 with the central cutout 66 in a traditional "dog bone" shape comprising a central rod 34 with a lobe 38 at either end. The upper cutout 68 comprises a half of a traditional "dog bone" shape divided along the rod 34 and through the lobes 38 with the lobes facing toward the central cutout 66. The lower cutout 70 comprises a half of a traditional "dog bone" shape divided along the rod 34 and through the lobes 38 with the lobes facing toward the central cutout 66. Preferably the horizontal edges 72 that contact the fuel rod are radius coined to produce a rounded edge 72 that bends away from the fuel rod and presents a smooth transition for the edge of the fuel rod when it contact the dimple 28 and 30.

FIG. 4 is a top view of the cell wall 32 showing a profile of the upper dimple 30.

Figure 5C:
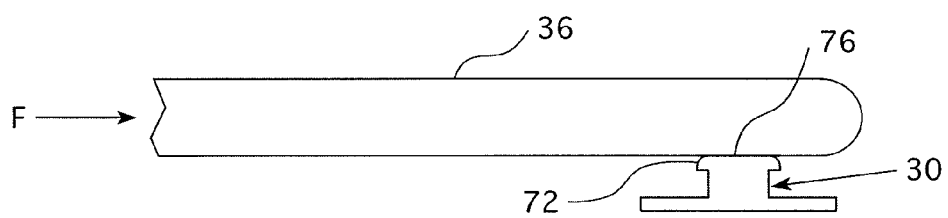
FIG. 5C is a schematic illustration of the arrangement shown in FIGS. 5A and 5B with the fuel rod tip loaded past the dimple.
Figure 5B:
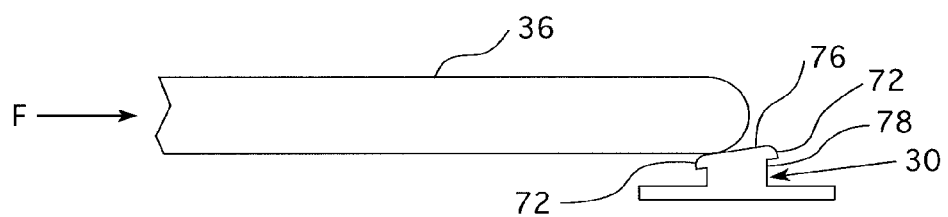
FIG. 5B is a schematic illustration of FIG. 5A with the fuel rod having advanced to engage the dimple.
Figure 5A:
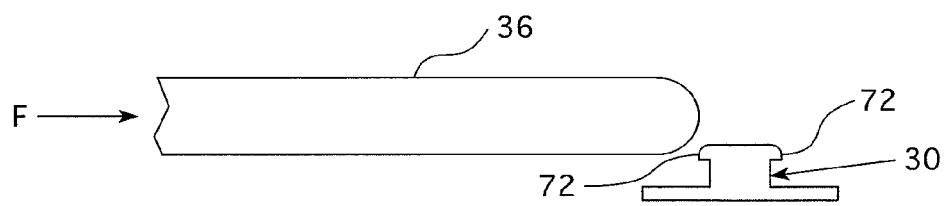
FIG. 5A is a schematic view of one of the dimples of FIGS. 3 and 4 that is about to encounter a fuel rod being loaded into the corresponding grid cell.

FIG. 5 is a series of schematics which show the fuel rod being loaded into the cell 16 and its interaction, from a side view, with a dimple 30 as the tip of the rod engages, slides along and passes over the dimple 30. Though a schematic side view of the dimple 30 is illustrated it should be appreciated that the dimple 28 will perform in the same manner. The "F" signifies the force being applied to the fuel rod 36 to load the rod in the assembly. In FIG. 5A the rod 36 is shown approaching the dimple which is illustrated in a static state. In FIG. 5B the fuel rod 36 engages the top or platform 76 which is supported by the pedestal leg 78 of the dimple 30 and pivots the platform downward on the side contacting the fuel rod 36 to reduce the pressure on the fuel rod and avoid scratching or galling the rod. In FIG. 5C the pedestal 76 returns to a horizontal orientation as the tip of the fuel rod 36 passes to conform to the line of the sidewall cladding of the fuel rod 36. Though the radius coining 72 is not shown in detail, its form will be readily appreciated by one of ordinary skill in the art.

Thus, radius coining reduces contact stresses during rod loading and the dimple "dog bone" window shape allows the dimple to pivot during rod loading, both of which minimize galling and scratching. When the "dog bone" window cutout is applied up into the radius of the formed dimple profile, it results in reducing the rigidity of the dimple, which minimizes wear related to dimple-to-rod contact. The additional benefits of the "dog bone" shape are that:

It increases the strength of the die punch, which will increase the life of the die insert;

It decreases the load needed to displace the dimple, since the area is reduced by the ends of the "dog bone" shape where the profile radius begins; and It increases the distance from the heat affected zone of the strap-to-strap welding, minimizing the thermal affects on the dimple, such as warping or cocking of the dimple.

Radius coining of the edges of the dimple in contact with the fuel rods that are orthogonal to the axis of the fuel rods, is a process that uses extreme force to displace material with a reduction in the work piece thickness that rounds the edges of the material and eliminates the typical work hardened/raised material common with historically chamfered dimple edges which lead to fuel rod scratching.

While specific embodiments of the invention have been described in detail, it will be appreciated by those skilled in the art that various modifications and alternatives to those details could be developed in light of the overall teachings of the disclosure. For example, while the preferred embodiment is directed to an improved grid for a pressurized water reactor fuel assembly, the principles of this invention could be applied to a boiling water reactor as well. Additionally, though the preferred embodiment employs two spaced, stacked dimples 28 and 30 it should be appreciated that the two dimples can be combined into a single elongated dimple, extending from modified "dog bone" cutouts, though the taller the dimple and the more it protrudes into the grid cell the stiffer the dimple, other compensations can be used to temper the stiffness to that desired. Accordingly, the particular embodiments disclosed are meant to be illustrative only and not limiting as to the scope of the invention which is to be given the breath of the appended claims and any and all equivalents thereof.

What is claimed is:

1. A nuclear fuel assembly grid comprising:
a first plurality of spaced, parallel, elongated straps;
a second plurality of spaced, parallel, elongated straps positioned orthogonal to said first plurality of spaced, parallel, elongated straps and aligned in a regular pattern so that the intersection of each set of four adjacent straps defines a cell, some of which are designed to support fuel rods, with an extent of each of the first and second straps that border each cell forming a wall of the cell;
wherein at least one wall of the cells that are designed to support fuel rods has a dimple arrangement that extends from the wall into the cell from a "dog bone" shaped cutout in the wall of the cell and the dimple arrangement has a downstream edge that contacts the fuel rod when the fuel rod is loaded into the grid wherein the downstream edge, in relation to the flow of coolant when the nuclear fuel assembly grid is placed in the core of an operating nuclear reactor, is rounded in a direction away from the fuel rod.

2. The nuclear fuel assembly grid of claim 1 wherein the rounded edge is formed by radius coining.

3. The nuclear fuel assembly grid of claim 1 wherein the dimple arrangement has an upstream edge, in relation to the flow of coolant when the nuclear fuel assembly grid is placed in the core of an operating nuclear reactor, that is rounded in a direction away from the fuel rod.

4. The nuclear fuel assembly grid of claim 1 wherein substantially all of the edges of the dimple arrangement that come in contact with the fuel rod that are orthogonal to an axis of the fuel rod are rounded in the direction away from the fuel rod.

5. The nuclear fuel assembly grid of claim 1 wherein the first and second plurality of straps have an axial dimension that extends along the elongated dimension of the straps and the "dog bone" shaped cutout and the dimple extend parallel to the axial dimension.

6. The nuclear fuel assembly grid of claim 5 wherein the "dog bone" shaped cutout of the dimple arrangement comprises three separate and distinct spaced cutouts that are stacked in spaced relationship along a height of the wall of the cell with a central cutout in a traditional "dog bone" shape comprising a central rod with a lobe at either end, an upper cutout comprising a half of a traditional "dog bone" shape divided along the rod and through the lobes with the lobes facing toward the central cutout and a lower cutout comprising a half of a traditional "dog bone" shape divided along the rod and through the lobes with the lobes facing toward the central cutout.

7. The nuclear fuel assembly grid of claim 6 wherein the dimple arrangement comprises first and second dimples wherein the first dimple is formed between the central cutout and the upper cutout and the second dimple is formed between the central cutout and the lower cutout.

8. The nuclear fuel assembly grid of claim 1 wherein the dimple arrangement in a side view comprises a pedestal with a platform on top that extends out over the pedestal.

9. A nuclear fuel assembly having a plurality of grids arranged in a spaced, tandem array along a spaced, parallel array of nuclear fuel rods, at least one of the grids comprising:
a first plurality of spaced, parallel, elongated straps;
a second plurality of spaced, parallel, elongated straps positioned orthogonal to said first plurality of spaced, parallel, elongated straps and aligned in a regular pattern so that the intersection of each set of four adjacent straps defines a cell, some of which are designed to support fuel rods, with an extent of each of the first and second straps that border each cell forming a wall of the cell;
wherein at least one wall of the cells that are designed to support fuel rods has a dimple arrangement that extends from the wall into the cell from a "dog bone" shaped cutout in the wall of the cell and the dimple arrangement has a downstream edge that contacts the fuel rod when the fuel rod is loaded into the grid wherein the downstream edge in relation to the flow of coolant when the nuclear fuel assembly grid is placed in the core of an operating nuclear reactor, is rounded in a direction away from the fuel rod.

10. The nuclear fuel assembly of claim 9 wherein the rounded edge is formed by radius coining.

11. The nuclear fuel assembly of claim 9 wherein the dimple arrangement has an upstream edge, in relation to the flow of coolant when the nuclear fuel assembly grid is placed in the core of an operating nuclear reactor, that is rounded in a direction away from the fuel rod.

12. The nuclear fuel assembly of claim 9 wherein substantially all of the edges of the dimple arrangement that come in contact with the fuel rod that are orthogonal to an axis of the fuel rod are rounded in the direction away from the fuel rod.

13. The nuclear fuel assembly of claim 9 wherein the first and second plurality of straps have an axial dimension that extends along the elongated dimension of the straps and the "dog bone" shaped cutout and the dimple extend parallel to the axial dimension.

14. The nuclear fuel assembly of claim 13 wherein the "dog bone" shaped cutout of the dimple arrangement comprises three separate and distinct spaced cutouts that are stacked in spaced relationship along a height of the wall of the cell with a central cutout in a traditional "dog bone" shape comprising a central rod with a lobe at either end, an upper cutout comprising a half of a traditional "dog bone" shape divided along the rod and through the lobes with the lobes facing toward the central cutout and a lower cutout comprising a half of a traditional "dog bone" shape divided along the rod and through the lobes with the lobes facing toward the central cutout.

15. The nuclear fuel assembly of claim 14 wherein the dimple arrangement comprises first and second dimples wherein the first dimple is formed between the central cutout and the upper cutout and the second dimple is formed between the central cutout and the lower cutout.

16. The nuclear fuel assembly of claim 9 wherein the dimple arrangement in a side view comprises a pedestal with a platform on top that extends out over the pedestal.

17. The nuclear fuel assembly grid of claim 9 wherein the "dog bone" shaped cutout comprises two spaced cutouts, each comprising a half of the "dog bone" cutout shape split through a lobe at either end and along a central elongated rod extending between the lobes with an extended portion of the lobes of each half of the "dog bone" shaped cutout oriented to face a corresponding lobe of the other half of the "dog bone" shaped cutout.

18. The nuclear fuel assembly grid of claim 1 wherein the "dog bone" shaped cutout comprises two spaced cutouts, each comprising a half of the "dog bone" cutout shape split through a lobe at either end and along a central elongated rod extending between the lobes with an extended portion of the lobes of each half of the "dog bone" shaped cutout oriented to face a corresponding lobe of the other half of the "dog bone" shaped cutout.

* * * * *